(12) United States Patent
Amada

(10) Patent No.: US 7,669,689 B2
(45) Date of Patent: Mar. 2, 2010

(54) ELECTRIC POWER STEERING APPARATUS

(75) Inventor: Shinya Amada, Gunma (JP)

(73) Assignee: NSK Ltd., Tokyo (JP)

( * ) Notice: Subject to any disclaimer, the term of this patent is extended or adjusted under 35 U.S.C. 154(b) by 293 days.

(21) Appl. No.: 11/521,518

(22) Filed: Sep. 15, 2006

(65) Prior Publication Data

US 2007/0084665 A1 Apr. 19, 2007

(30) Foreign Application Priority Data

Oct. 19, 2005 (JP) .................... P. 2005-304316

(51) Int. Cl.
*B62D 5/04* (2006.01)
(52) U.S. Cl. .................... 180/443; 180/446; 180/444
(58) Field of Classification Search ................ 180/443, 180/444, 446
See application file for complete search history.

(56) References Cited

U.S. PATENT DOCUMENTS

| 4,610,328 | A | * | 9/1986 | Kanazawa et al. | .......... 180/414 |
| 4,817,986 | A | * | 4/1989 | Kanazawa et al. | .......... 280/781 |
| 4,890,683 | A | * | 1/1990 | Matsuda et al. | ............. 180/444 |
| 6,412,591 | B1 | | 7/2002 | Endo et al. | |
| 2003/0070866 | A1 | * | 4/2003 | Kitami et al. | ............... 180/444 |
| 2006/0027416 | A1 | * | 2/2006 | Mizuhara et al. | ............ 180/444 |
| 2006/0086087 | A1 | * | 4/2006 | Phillips | ........................ 60/384 |

FOREIGN PATENT DOCUMENTS

| GB | 2411874 A | 9/2005 |
| GB | 2421716 A | 7/2006 |
| JP | 2001-80528 A | 3/2001 |

* cited by examiner

*Primary Examiner*—Lesley Morris
*Assistant Examiner*—Marlon A Arce
(74) *Attorney, Agent, or Firm*—Sughrue Mion, PLLC

(57) ABSTRACT

Since a rigid supporting structure for a gear box GB and a rolling type rack supporting device RSD are employed, an electric power steering apparatus having no response delay and having a high transmission efficiency can be realized. Further, a high steering performance required for a long period and a steering assist force that is increasing recently can be efficiently transmitted to wheels. Further, when the wheels collide with a shoulder of a road to receive a counter input, a torque sensor TS detects a torque and an assist steering force against the counter input is outputted to an output shaft OS. Consequently, the torque of the counter input is restrained from being transmitted to a steering shaft SS side. Thus, a kick back and a vibration are advantageously hardly transmitted to a steering wheel SW from the wheels.

2 Claims, 5 Drawing Sheets

ELECTRIC POWER STEERING APPARATUS

BACKGROUND OF THE INVENTION

1. Field of the Invention

The present invention relates to an electric power steering apparatus, and more particularly to an electric power steering apparatus having a rack shaft and a pinion.

2. Description of the Background Art

As one type of a steering device for a vehicle, a rack and pinion type steering device has been known that a pinion is engaged with the rack teeth of a rack shaft to convert the rotating force and the quantity of rotation of the pinion to the axial thrust and the stroke of the rack shaft. Here, in the vehicle having a relatively large weight, to reduce the steering force and the quantity of steering of a driver, what is called a power steering apparatus for outputting a steering assist force is ordinarily provided.

The power steering apparatus is roughly classified into a hydraulic power steering apparatus and an electric power steering apparatus. In the hydraulic power steering apparatus, a hydraulic pressure is generated by a control valve provided in a pinion shaft in accordance with a steering torque exerted on the steering wheel of the driver to allow the hydraulic pressure to act on a hydraulic cylinder provided on the rack shaft, so that a thrust is directly generated in the moving direction of the rack shaft. Accordingly, the steering torque exerted on the steering wheel by the driver may be low enough for the control valve to be operated. Further, to reduce a steering quantity, a stroke ratio is set that is larger than that of a manual steering device.

On the other hand, the electric power steering apparatus outputs a steering assist force to a steering shaft or a rack shaft by an electric motor in accordance with the steering torque exerted on the steering wheel. Since the electric power steering apparatus does not require a hydraulic pump, hydraulic piping, a hydraulic oil tank or the like as compared with the hydraulic power steering apparatus, the electric power steering apparatus has an excellent feature that it has a compact structure. Accordingly, the electric power steering apparatus is initially adopted for a light-weight vehicle such as a light car, however, recently, the electric power steering apparatus has been applied to a vehicle whose weight is heavy. The electric power steering apparatus includes the electric power steering apparatus of what is called a column assist type that the electric motor is attached to a steering column to directly output the steering assist force to the steering shaft or the electric power steering apparatus of what is called a pinion assist type that the electric motor is attached to a rack and pinion device to directly output the steering assist force to a pinion shaft. According to the electric power steering apparatuses of these types, a large force having the steering assist force of the electric motor added is transmitted between the pinion and the rack teeth of the rack shaft.

As a method for fixing the rack and pinion type steering device to a vehicle body, a fixing structure having an elastic member has been hitherto frequently employed for the purpose of absorbing a vibration transmitted from wheels. However, in recent years, a higher steering performance is requested. To satisfy this request, for instance, in Japanese Patent Unexamined Publication JP-A-2001-80528, an example is disclosed in which the elastic member is not employed and a steering gear box is supported with high rigidity to increase an attaching rigidity. According to this example, since a steering gear is not moved relatively to a vehicle body during a start of steering, a response delay does not arise so that an excellent steering performance is realized.

However, in the structure for supporting the steering gear box with high rigidity as mentioned above, the steering operation is directly carried out as described above, and accordingly, though the higher steering performance can be realized, a kick back and a vibration as a counter input from the wheels are disadvantageously directly transmitted to the steering wheel side.

Further, hammering sound (rattling sound) is undesirably generated on the surfaces of gear teeth in a pinion gear engaging part, which has been hitherto frequently a problem in a steering system. As a backlash provided in a gear part is more increased, the hammering sound is apt to be more increased. Further, as the amplitude and the frequency of the vibration transmitted from the wheels are larger, the hammering sound is the larger and the more frequently generated. Thus, there is a fear that the hammering sound gives a discomfort to a driver or members getting on a vehicle.

Generally, when the vehicle has been used for a long period, if the abrasion of a pinion gear part and the abrasion of a rack guide part are increased, the backlash of the gear part is increased and the rattle sound tends to be more frequently generated. Further in the structure for supporting the steering gearbox with high rigidity, since the kickback and the vibration are directly inputted to the gear box from the vehicle body, a problem arises that the vehicle is extremely disadvantageous to the rattle sound as compared with the vehicle having a structure for elastically supporting the gear box.

SUMMARY OF THE INVENTION

The present invention is proposed by considering the above-described problems of a related art and it is an object of the present invention to provide an electric power steering apparatus of a rack and pinion type that has a high transmission efficiency, is excellent in its abrasion resistance and can effectively suppress a kick back or a vibration.

According to a first aspect of the present invention, there is provided an electric power steering apparatus comprising:

an electric motor that output a steering assist force;

a sub-frame attached to a vehicle body without using an elastic member;

a gear box attached without using an elastic member to the sub-frame;

a rack shaft comprising rack teeth, and being movable relative to the gear box and connected to a steering mechanism;

a pinion shaft comprising pinion teeth which engages with the rack teeth to transmit a steering force from a steering wheel to the rack shaft; and a rack supporting device provided in the gear box and comprising a rolling element rolling on a surface of the rack shaft which is an opposite side of the rack teeth of the rack shaft.

According to a second aspect of the invention, as set forth in the first aspect of the invention, the electric power steering apparatus is a column assist type.

Note that in the column assist type, the steering assist torque is inputted to the column.

According to a third aspect of the invention, the electric steering device is a pinion assist type.

Note that in the pinion assist type, the steering assist torque is inputted to the pinion shaft.

According to a fourth aspect of the invention, the electric power steering apparatus as set forth in the first aspect of the invention, further comprising:

a torque sensor that detects counter torque from a road wheel;

a control unit that controls the steering assist force wherein when the torque sensor detects the counter torque from the road wheel, the control unit controls the assist steering force so as to be against the detected counter torque.

According to a fifth aspect of the invention, as set forth in the first aspect of the invention, the gear box is attached to the sub-frame via a bolt.

The supporting device for supporting the rack shaft includes a sliding type rack supporting device and a rolling type rack supporting device.

A basic structure of the rack and pinion type steering device has a rack and pinion type gear structure in which a rotating movement from the steering wheel side is converted to a linear movement of the rack shaft. Accordingly, the pinion gear part requires an arbitrary backlash so that an engagement is smoothly carried out throughout all the area of a stroke. In the sliding type rack supporting device, the back surface of a rack is supported through a sliding bearing by a rack guide pressed by an elastic member such as a coil spring to withstand a revolting force generated in the pinion gear part so as to suppress the above-described rattling sound.

In the sliding type rack supporting device, since an abrasion on the sliding surface of the rack guide is ordinarily large, a contrivance disclosed in JP-A-2004-299514 is made. However, in the sliding type rack supporting device, the abrasion on the sliding surface is hardly greatly suppressed. In the case of a more severe condition such as a high input load, an early abrasion is concerned.

As compared therewith, the rolling type rack supporting device supports the back surface of the rack shaft through a rolling element such as a roller in the rack and pinion type steering device. In an operating mechanism, when a torque is inputted to a pinion shaft, since the gear teeth surface has a pressure angle, a revolting force is generated toward the rack supporting device from the engaging part to press the back surface of the rack to the rolling element. In the sliding type rack supporting device, a frictional force is generated on the sliding surface. As the revolting force becomes larger, the frictional force is the more increased. However, in the rolling type rack supporting device, even when the revolting force is increased, the frictional force is not increased more than that of the sliding type rack supporting device. Accordingly, it may be said that the rolling type rack supporting device having the rolling element as in the present invention can obtain a transmission efficiency higher than that of the sliding type rack supporting device.

In the rolling type rack supporting device, since a supporting part has a rotating structure of the rolling element, the abrasion resistance can be more greatly suppressed than that of the sliding type rack supporting device. Therefore, the rolling type rack supporting device may be said to be very effective means for improving a durability (preventing a rattle sound for a long time) in the structure for supporting the gear box with high rigidity.

However, in the case of the so-called supporting structure with high rigidity that the gear box is directly fixed to the vehicle body without using the elastic member, since the kick back from the wheels is directly inputted to the steering wheel as described above, a problem arises that the kick back and the vibration are ordinarily liable to be transmitted to the steering wheel through a tie rod, a rack shaft, a pinion shaft, an intermediate shaft and a column shaft.

Further, since the above-described rolling type rack supporting device has a lower friction and a higher transmission efficiency than the friction and the transmission efficiency of the sliding type rack supporting device, the rolling type rack supporting device is effective means to easily transmit a higher steering performance to the wheel side. On the contrary, since the rolling type rack supporting structure is high in its opposite efficiency, a problem arises that the rolling type rack supporting device is apt to transmit the kick back from the wheels to the steering wheel due to its structure.

As compared therewith, when the electric power steering apparatus receives the counter input from the wheels owing to the structure of a system, the electric power steering apparatus detects a torque by a torque sensor to assist a output shaft with an assist force against the counter input by a motor and a speed reducer. As a result, the electric power steering apparatus does not transmit the torque of the counter input to an input shaft side and can control and drive the wheels to hardly transmit the kickback and the vibration to the steering wheel.

Accordingly, in the electric power steering apparatus of the present invention, the supporting structure for the gear box with high rigidity and the rolling type rack supporting device are adopted so that a system structure having no response delay and a high transmission is realized. Further, in the electric power steering apparatus according to the present invention, a higher steering performance requested in the electric power steering apparatus for a long period and a controlled assist force that is increasingly improved in recent years can be efficiently transmitted to the wheels.

Additionally, the kickback and the vibration from the wheels that are apt to be outstanding when the supporting structure for the gear box with high rigidity and the rolling type rack supporting device are employed can be effectively restrained from being transmitted to the steering wheel by using the characteristics of the electric power steering apparatus. Accordingly, in the structure having the above-described devices combined, the driver can have an operating feeling with a high rigidity and a high steering performance by a finely controlled steering operation in which a steering force is suitably reduced. Further, this performance can be maintained while the vehicle is used for a long period. As described above, in the electric power steering apparatus of the present invention, the system can be formed in which members can respectively mutually take out the advantages of the structures thereof and can respectively mutually compensate for the disadvantages of the structures thereof. Thus, effects that are not simply combined together can be obtained.

The electric power steering apparatus according to the present invention is preferably a column assist type or a pinion assist type.

DETAILED DESCRIPTION OF THE PREFERRED EMBODIMENTS

Figure 1:
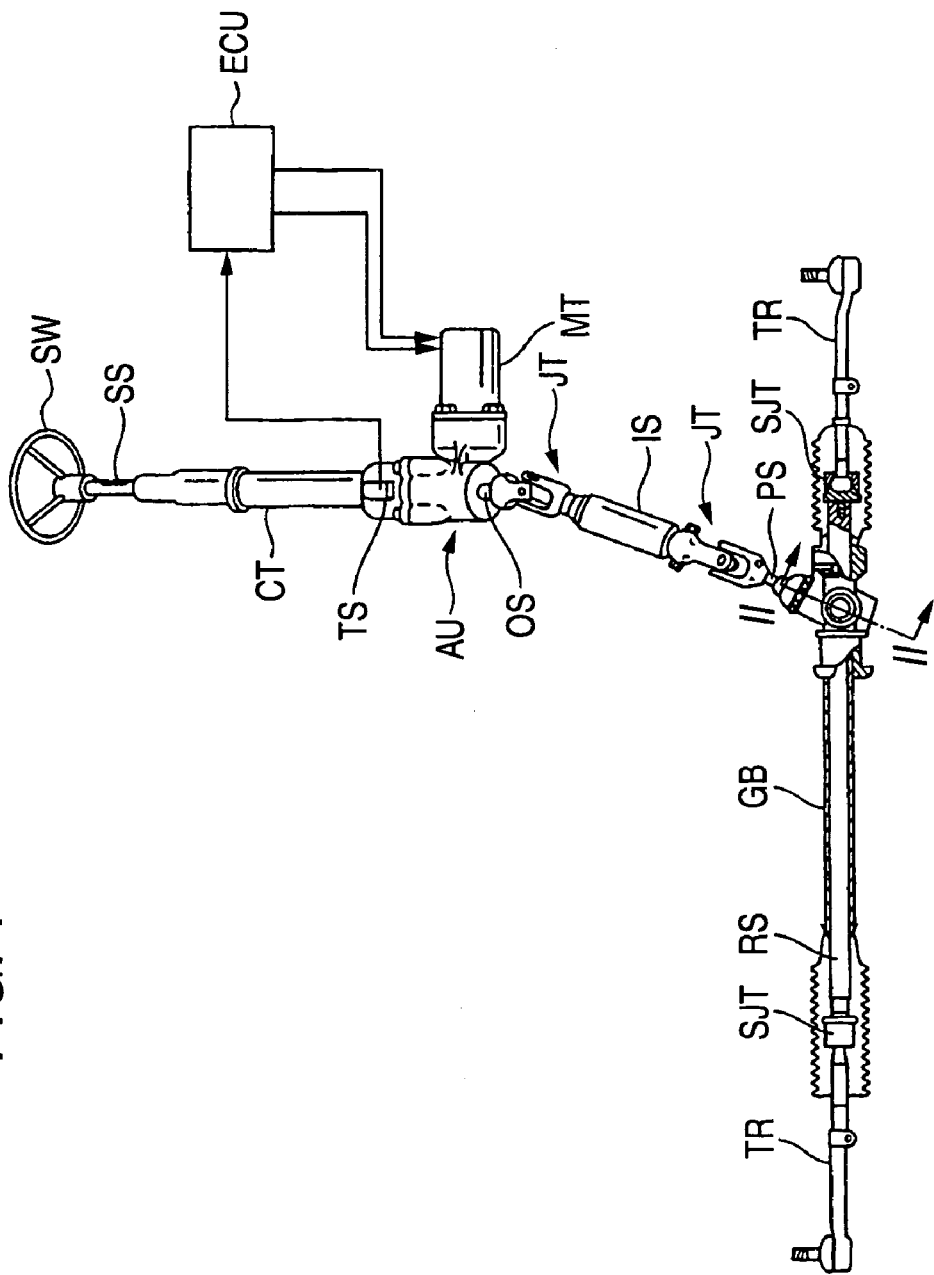
FIG. 1 is a schematic structural view of an electric power steering apparatus of a column assist type according to a first embodiment.

Now, embodiments of the present invention will be described by referring to the drawings. FIG. 1 is a schematic structural view of an electric power steering apparatus of a column assist type according to a first embodiment. In the drawing, a lower end of a steering shaft SS having a steering wheel SW attached to an upper end is extended in a column tube CT and connected to an upper end of a torsion bar (not shown in the drawing) of an assist unit AU. A lower end of the torsion bar is connected to an upper end of an output shaft OS connected to a motor MT through a speed reducer (for instance, a worm mechanism). A torque sensor TS is provided that outputs a torque signal corresponding to a torque received in accordance with the twist of the torsion bar. The torque signal outputted form the torque sensor TS is transmitted to a controller ECU. The controller ECU transmits a driving signal to the motor MT on the basis of the inputted torque signal and information such as a vehicle speed. Accordingly, the motor MT controlled to be driven inn accordance with the driving signal outputs an assist torque to the output shaft OS through the speed reducer.

The output shaft OS is connected to an intermediate shaft IS through a joint JT and the intermediate shaft IS is connected to a pinion shaft PS through a joint JT.

Figure 2:
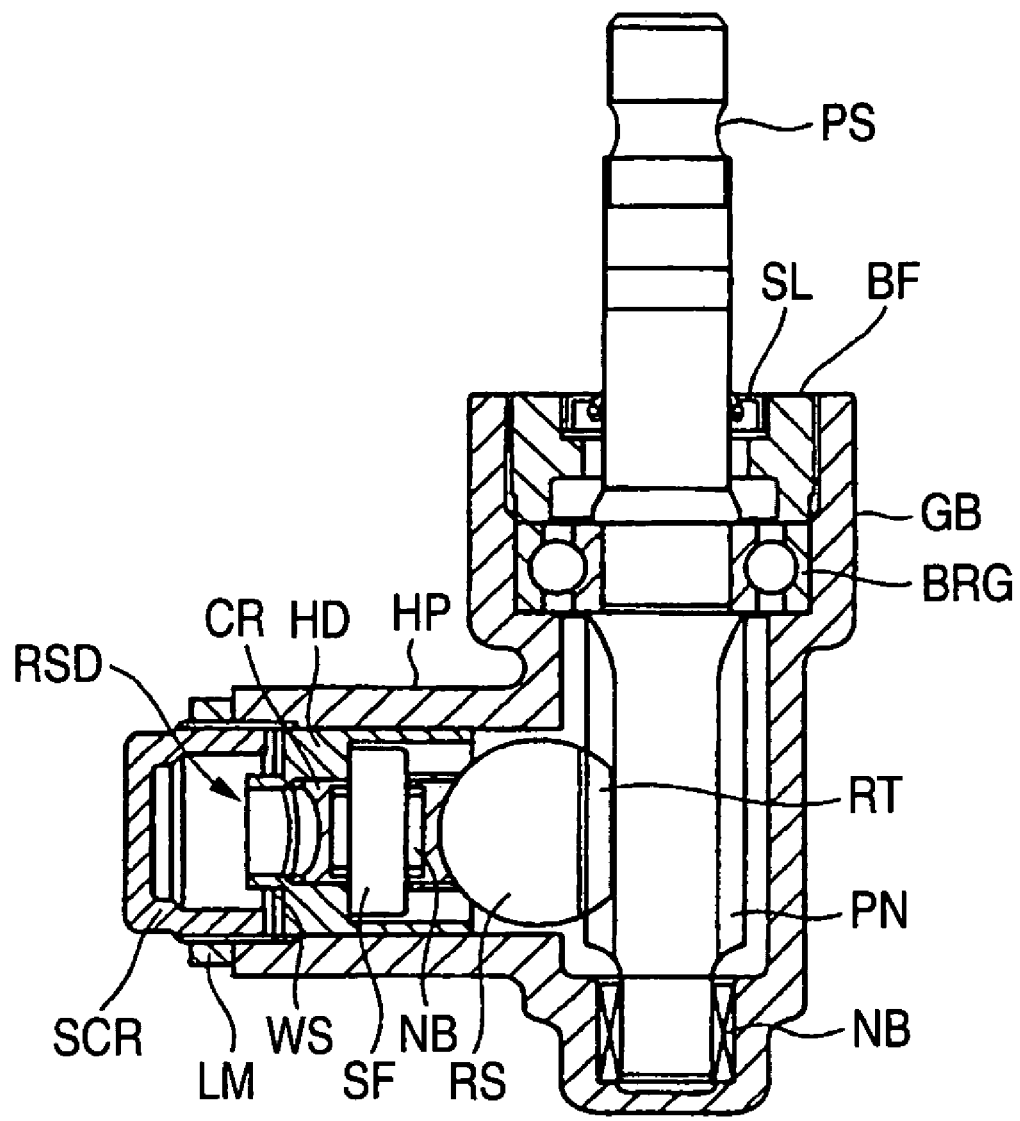
FIG. 2 is a diagram taken along a line of II-II of a structure shown in FIG. 1 and viewed from an arrow mark.

FIG. 2 is a diagram taken along a line of II-II of a structure shown in FIG. 1 and viewed from an arrow mark. In FIG. 2, the pinion shaft PS extending in the vertical direction of a gear box GB is sealed by a seal SL formed in the inner periphery of a bearing fixing member BF screwed to the gear box GB. Further, the pinion shaft PS is supported so as to freely rotate in the gear box GB by a bearing BRG fixed by the bearing fixing member BF and a needle bearing NB.

Between the bearing BRG and the needle bearing NB of the pinion shaft PS, pinion teeth PN are formed. The pinion teeth PN are engaged with rack teeth RT of a rack shaft RS.

The gearbox GB forms a hollow post part HP extending leftward in the drawing from the periphery of the rack shaft RS. In the hollow post part HP, a rack supporting device RSD is arranged. The rack supporting device RSD includes a cylindrical hollow holder HD, a shaft SF having both ends attached to a groove of the holder HD, a cylindrical roller CR arranged in the periphery of the shaft SF and serving as a hand drum shaped rolling element abutting on the back surface of the rack shaft RS, a needle bearing NB for supporting the cylindrical roller CR so as to freely rotate relative to the shaft SF, a screw member SCR for attaching the holder HD to the hollow post part HP, a disk spring WS arranged between the screw member SCR and the holder HD to urge the holder HD toward the rack shaft RS side and a lock member LM of the screw member SCR. A screwed amount of the screwmember SCR is adjusted to change a compression amount of the disk spring WS so that the pressing force of the rack shaft RS can be adjusted. After the pressing force is adjusted, the screw member SCR can be locked and fixed by the lock member LM to prevent the screwmember from being unfastened.

In FIG. 1, both the ends of the rack shaft RS protrude from the gearbox GB and are connected to tie rods TR forming a steering device through ball joints SJ. The rack shaft RS moves in the longitudinally direction to roll and steer wheels not shown in the drawing.

Figure 3:
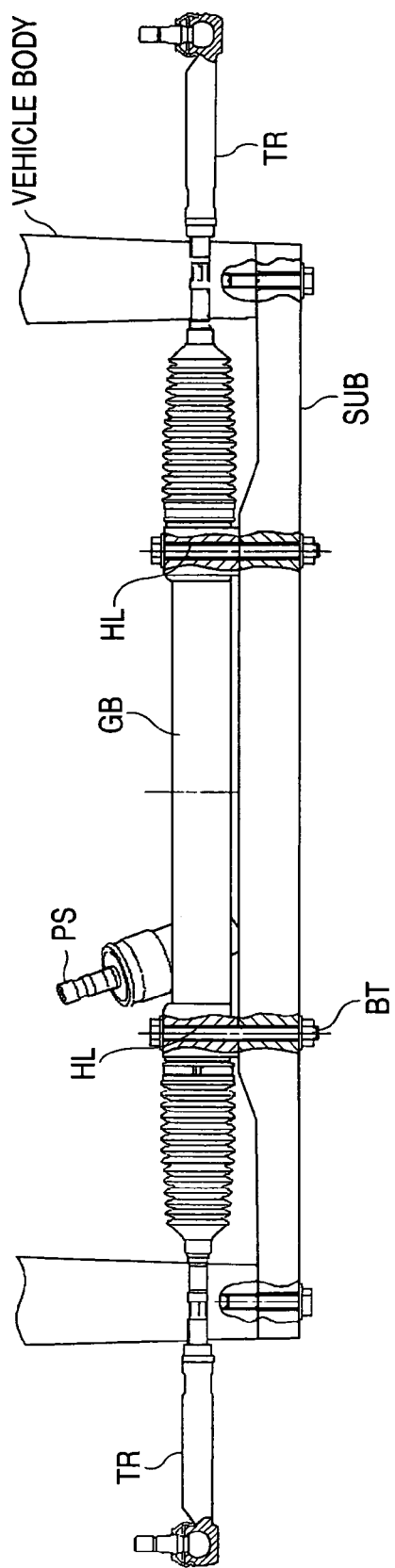
FIG. 3 is a view showing a fixed state of a gear box GB.

FIG. 3 is a view showing a fixed state of the gear box GB. As shown in FIG. 3, the gearbox GB is directly fixed to a sub-frame SUB of a vehicle by bolts BT and ST inserted into attaching holes HL and HL without using elastic members.

An operation of this embodiment is described. When a steering force is inputted to the steering wheel SW, the steering force is transmitted to the torsion bar in the assist unit AU through the steering shaft SS. At this time, a steering assist force generated by the motor MT controlled to be driven by the controller ECU in accordance with the torque signal outputted from the torque sensor TS is transmitted to the output shaft OS. The steering force to which the steering assist force is added is further transmitted to the pinion shaft PS through the intermediate shaft IS. The rotating force of the pinion shaft PS is converted to the longitudinal thrust of the rack shaft RS through the pinion teeth PN engaging with the rack teeth RT and the wheels not shown in the drawing are rolled and steered through the tie rods TR in accordance with the longitudinal thrust. At this time, the cylindrical roller CR rolls on the back surface of the rack shaft RS to allow the rack shaft RS with a low friction. Further, when a strong force is transmitted between the pinion shaft PS and the rack shaft RS, a separating force is generated for separating the rack shaft RS from the pinion shaft PS, however, the separating force can be supported by the cylindrical roller CR.

According to the electric power steering apparatus of this embodiment, since the rigid supporting structure for the gear box GB and the rolling type rack supporting device RSD are employed, the structure of a system having no response delay and having a high transmission efficiency can be realized. Further, a high steering performance required for a long period in the electric power steering apparatus and the steering assist force that is increasingly enhanced in recent years can be efficiently transmitted to the wheels. Further, for instance, when the wheels not illustrated collide with and abut on a shoulder to receive a counter input, the torque is detected by the torque sensor TS and the assist steering force against the counter input can be outputted to the output shaft OS by the motor MT and the speed reducer. Consequently, the torque of the counter input is restrained from being transmitted to the steering shaft SS side. Thus, the kickback and the vibration are advantageously hardly transmitted to the steering wheel SW from the wheels.

Figure 4:
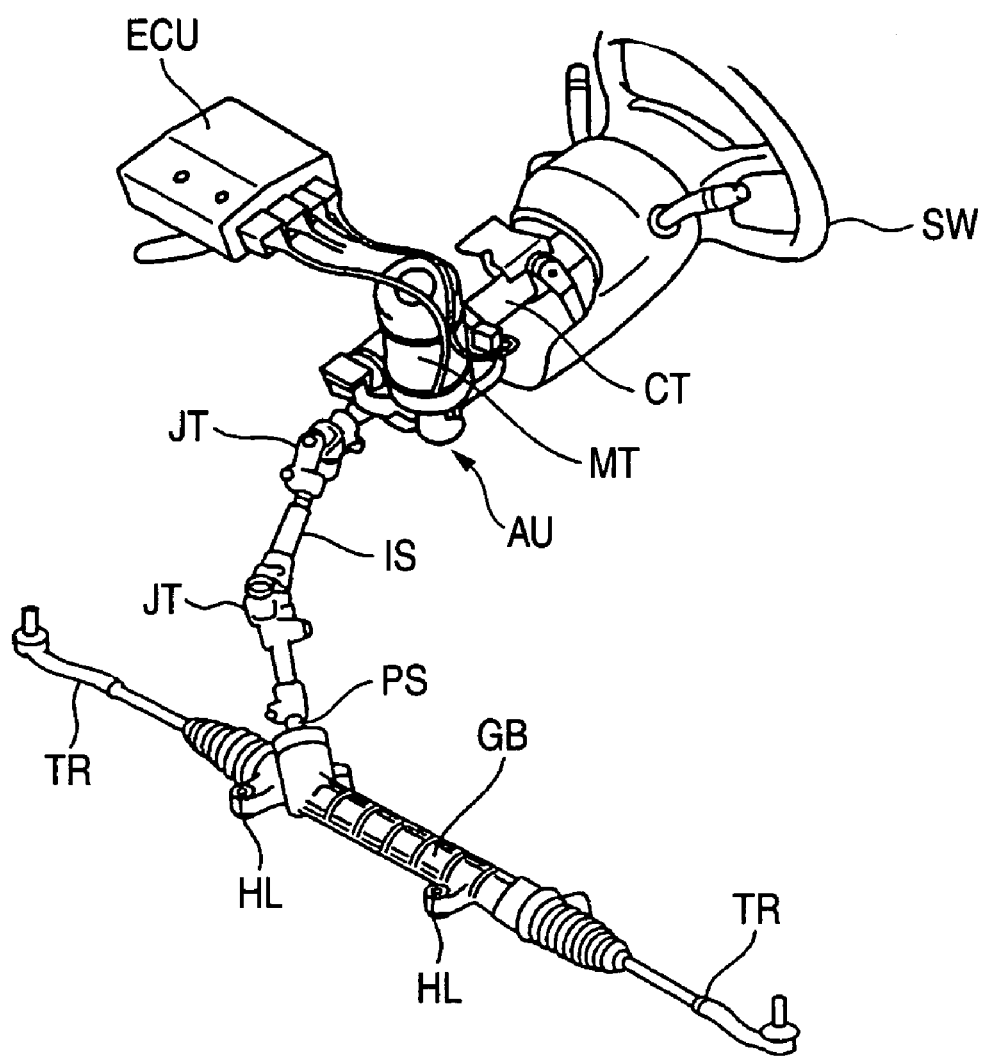
FIG. 4 is a schematic perspective view of an electric power steering apparatus of a column assist type according to a second embodiment.

FIG. 4 is a schematic perspective view of an electric power steering apparatus of a column assist type according to a second embodiment. Since this embodiment is basically the same as the embodiment shown in FIGS. 1 to 3, the electric power steering apparatus is designated by the same reference numerals and an explanation thereof is omitted.

Figure 5:
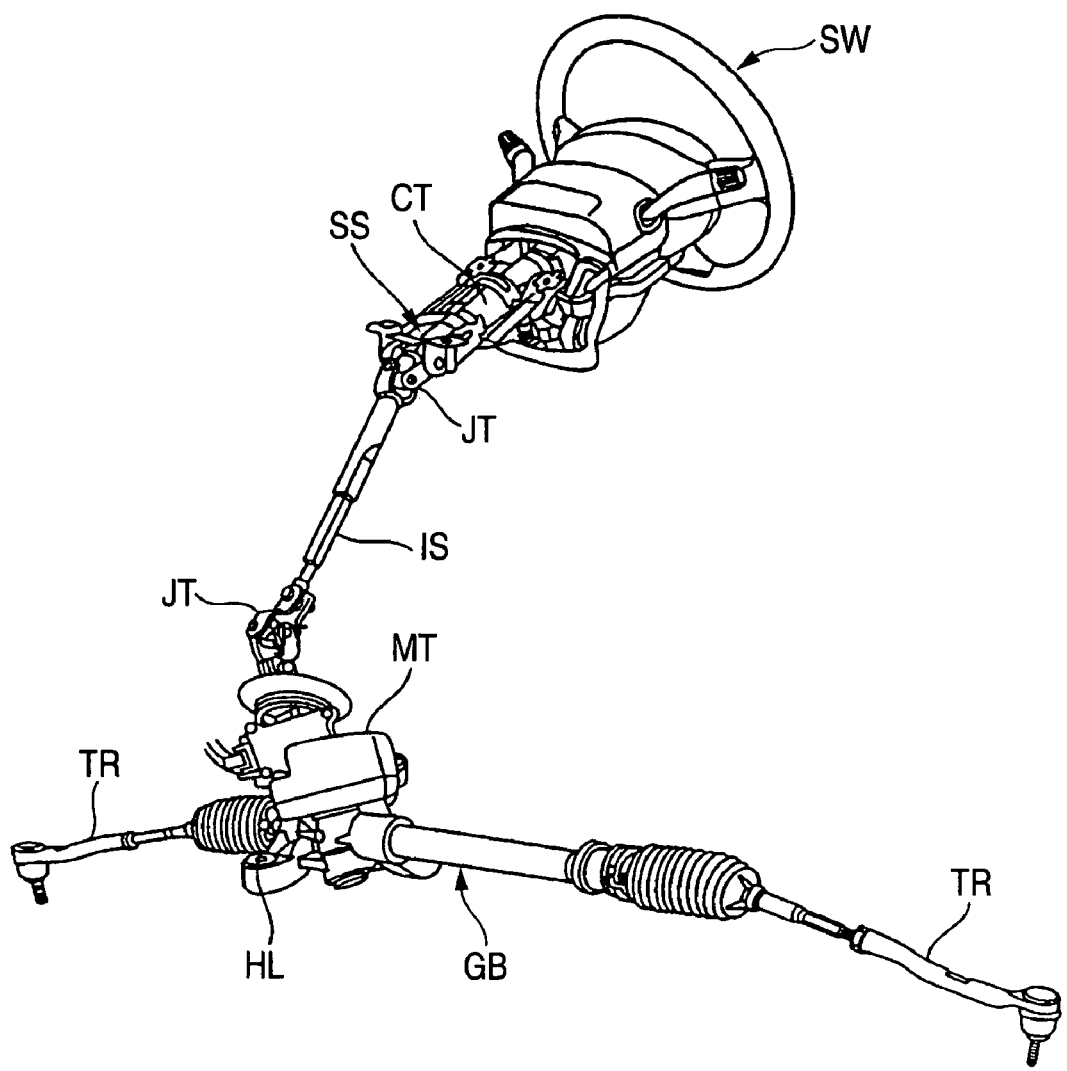
FIG. 5 is a schematic perspective view of an electric power steering apparatus of a pinion assist type according to a third embodiment.

FIG. 5 is a schematic perspective view of an electric power steering apparatus of a pinion assist type according to a third embodiment. In this embodiment, a motor MT is arranged in a gear box GB to output a steering assist force to a pinion PS through a speed reducer not shown in the drawing. Since other points than the above-described point are the same as those of the embodiment shown in FIGS. 1 to 3, they are designated by the same reference numerals and an explanation thereof is omitted.

The present invention is described above with reference to the embodiments, however, it is to be understood that the present invention is not limited to the above-described embodiments and the present invention may be suitably changed or improved.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. An electric power steering apparatus comprising:
   a steering shaft to which a steering wheel is attached;
   an output shaft connected to the steering shaft;
   a motor outputting an assist torque to the output shaft;
   a pinion shaft which is connected to the output shaft via an intermediate shaft and comprising pinion teeth on outer circumference thereof;

a rack shaft comprising rack teeth which engage with the pinion teeth provided on a part of an outer circumference thereof; and a rack supporting device comprising rolling elements which abut with a part of the outer circumference of the rack shaft which is opposite side of the part of the outer circumference of the rack shaft on which the rack teeth are provided, wherein the rack supporting device further comprises:

a cylindrical holder having a pair of grooves extending in longitudinal direction;

an auxiliary shaft of which both ends are attached to the grooves; and a bearing which rotatably supports the rolling element around the auxiliary shaft.

2. The electric power steering apparatus as set forth in claim 1, wherein the rack supporting device further comprises;

a screw member which attaches the holder to the gear box;

a disc spring which is interposed between the screw member and the holder and urges the holder toward the rack shaft; and a lock member which locks the screw member relative to the gear box, wherein a screwing amount of the screw member relative to the gear box is adjusted so as to adjust a magnitude of a urging force of the disc spring.

* * * * *